United States Patent
Wu

(10) Patent No.: US 8,249,640 B2
(45) Date of Patent: Aug. 21, 2012

(54) METHOD FOR DETERMINING A PAGING SLOT OF A CDMA MOBILE STATION TRUNKING SERVICE

(75) Inventor: Chuanxi Wu, Shenzhen (CN)

(73) Assignee: ZTE Corporation, Guangdong Province (CN)

( * ) Notice: Subject to any disclaimer, the term of this patent is extended or adjusted under 35 U.S.C. 154(b) by 262 days.

(21) Appl. No.: 12/809,799

(22) PCT Filed: Dec. 16, 2008

(86) PCT No.: PCT/CN2008/073535
§ 371 (c)(1),
(2), (4) Date: Jun. 21, 2010

(87) PCT Pub. No.: WO2009/082929
PCT Pub. Date: Jul. 9, 2009

(65) Prior Publication Data
US 2010/0267395 A1    Oct. 21, 2010

(30) Foreign Application Priority Data

Dec. 21, 2007 (CN) .......................... 2007 1 0302077

(51) Int. Cl.
*H04B 7/00* (2006.01)
(52) U.S. Cl. ........ 455/520; 455/521; 455/519; 455/458; 455/418; 455/452.1; 455/450; 455/509
(58) Field of Classification Search .................. 455/521, 455/520, 450, 519, 452.1, 509
See application file for complete search history.

(56) References Cited

U.S. PATENT DOCUMENTS

2006/0056361 A1 *    3/2006    Jiang et al. .................... 370/335
* cited by examiner

*Primary Examiner* — Kwasi Karikari
(74) *Attorney, Agent, or Firm* — Scully, Scott, Murphy & Presser, P.C.

(57) ABSTRACT

The present invention provides a method for determining a paging slot of a CDMA mobile station trunking service. The method includes two situations: the mobile station supporting the minus slot function and not supporting the minus slot function. When the station supports the minus slot function, according to the matching situation of the system identifier and a network identifier of a base station, and the system identifier and the network identifier stored in the mobile station, and whether the minus slot paging cycle information is contained on the paging channel overhead message, the paging slot is determined by different modes.

8 Claims, 3 Drawing Sheets

METHOD FOR DETERMINING A PAGING SLOT OF A CDMA MOBILE STATION TRUNKING SERVICE

FIELD OF THE INVENTION

The present invention relates to communication field, and in particular to a method for determining a paging slot of a mobile station in a Code Division Multiple Access (CDMA) trunking system.

BACKGROUND OF THE INVENTION

At present, there are two kinds of paging modes in the CDMA system: a slotted mode and a non-slotted mode, wherein the non-slotted mode refers to a working mode that a mobile station monitors a forward-paging channel (F-PCH) continuously rather than monitors according to a designated slot.

Since the mobile station needs to perform demodulating and decoding to the F-PCH continuously, and to process the messages in the F-PCH, it will result in that the power in the battery is consumed very soon. In addition, under the circumstance that there is no any paging on the F-PCH, the system will broadcast a system parameter message periodically. For the mobile station which has obtained the parameters correctly and is in an idle state, to receive the parameters repeatedly is a kind of waste.

Therefore, in order to decrease the unnecessary monitoring of the mobile station to the F-PCH, and prolong the service time of the battery under the idle state, the slotted mode is provided in IS-95, this mode may correspond to the non-slotted mode. When working in the slotted mode, the mobile station under the idle state does not monitor the F-PCH continuously, but monitors the F-PCH at a designated time period at a certain interval according to a certain rule. The mobile station is in a sleep state in the intervals between every two times of F-PCH monitoring, i.e., the baseband processor and the radio frequency circuit reduce workload, or even stop working, therefore power consumption can be reduced.

In the slotted mode, the basic unit for dividing time is the slot of the F-PCH. The time length of one slot is 80 ms, i.e., four 20 ms paging channel frames. The mobile station in the slotted mode usually monitors the F-PCH once at a certain interval in the idle state. The time interval is called slot cycle, and the mobile station generally monitors one or two slots during one slot cycle. The slot cycle length which takes 1.28 s (=16×80 ms) as unit must be 1, 2, 4, 8, 16, 32, 64 or 128 times of 1.28 s. If T represents the slot cycle length, $T=1.28\times 2^i$ s, wherein i is a slot cycle index which can take the integral value from 0 to 7. The maximum value of the slot cycle may be 2048 slots, i.e., 163.84 s. Besides, a user may adjust the length of slot cycle expected by setting the slot cycle index of the station of his/her own wish. The slot cycle index after being adjusted is reported to the system through the messages of parameter change registration, originating call, paging response and so on.

In addition, the adjustment range of the user to the slot cycle is limited by current network configuration situation. In the system parameter message of the mobile station in the broadcast service area, there is a parameter, i.e., a max slot cycle index. This index stipulates the maximum slot cycle allowable to be used in current system. The slot cycle index actually used by the mobile station needs to be determined according to practical situation.

As mentioned above, in the slotted mode, the mobile station only monitors the paging at particular times, and generally only monitors one or two time period in the paging channel slot cycle, so that the power consumption of the mobile station is saved and the lifetime of the battery is prolonged. On the other hand, in the non-slotted working mode, the mobile station needs to monitor all the paging time periods.

In the trunking system, besides the parameters such as the slot cycle index in the original system, a push to talk (PTT) max slot cycle index is also introduced, which stipulates the parameters such as the maximum slot cycle index allowable to be used in current PTT system.

In addition, in the PTT system, there is a plurality of reasons resulting in the problem that it is slow to access for the mobile station being called after starting up, thus the functions such as PTT calling is limited. However, a technical scheme which can solve the problem has not been proposed yet.

SUMMARY OF THE INVENTION

Considering the problem existed in the related art that it is slow to access for the mobile station being called after starting up, the present invention is proposed. The main object of the present invention is to provide an improved scheme for determining a paging slot of a CDMA mobile station trunking service to solve at least one of the above problems in the related art.

In order to achieve the above object, according to one aspect of the present invention, a method for determining a paging slot of a CDMA mobile station trunking service is provided.

The method for determining a paging slot of a CDMA mobile station trunking service provided according to the present invention, when the mobile station supports the minus slot function, the method comprises: if a system identifier and a network identifier of a base station do not match with any one in a system identifier and a network identifier list stored in the mobile station, the mobile station calculates a paging slot according to a slot cycle index which is a value not more than the smaller of a max slot cycle index and 1; otherwise, if the mobile station receives minus slot paging cycle information on a paging channel overhead message, and the mobile station has stored a piece of minus slot paging cycle information, the mobile station calculates the paging slot by obtaining a minimal value from a max PTT slot cycle index, a PTT slot cycle index, the max slot cycle index, and a slot cycle index;

if the mobile station receives the minus slot paging cycle information on the paging channel overhead message, but the mobile station has not stored a piece of the minus slot paging cycle information, the mobile station calculates the paging slot by obtaining a minimal value from the max PTT slot cycle index, the max slot cycle index, and the slot cycle index;

if the mobile station does not receive the minus slot paging cycle information on the paging channel overhead message, but the mobile station has stored a piece of the minus slot paging cycle information, the mobile station calculates the paging slot by obtaining a minimal value from the PTT slot cycle index, the max slot cycle index, and the slot cycle index;

if the mobile station does not receive the minus slot paging cycle information on the paging channel overhead message, and the mobile station has not stored a piece of the minus slot paging cycle information, the mobile station calculates the paging slot by obtaining a minimal value from the max slot cycle index and the slot cycle index.

Wherein if a user instructs the mobile station to modify the slot cycle index, the mobile station executes a parameter change registration.

Preferably, a PTT version number corresponding to the function of the mobile station is stored in the mobile station. The mobile station supporting the minus slot function means the PTT version number is larger than or equal to 4.

Wherein if the PTT version number of the mobile station is 1, it corresponds to PTT enhanced group call; if the PTT version number of the mobile station is 2, it corresponds to supporting a quick call access of the mobile station; if the PTT version number of the mobile station is 3, it corresponds to supporting a big group paging of the mobile station; if the PTT version number of the mobile station is 5, it corresponds to supporting a minus slot paging and the first stage of a PTT traditional group call of the mobile station; if the PTT version number of the mobile station is 6, it corresponds to the mobile station supporting a supplementary channel transmitting signaling and the second stage of the PTT traditional group call.

Preferably, when the mobile station does not support the minus slot function, the method for determining a paging slot of a CDMA mobile station trunking service of the present invention comprises: if the system identifier and the network identifier of the base station do not match with any one in the system identifier and the network identifier list stored in the mobile station, the mobile station selects a value not more than the smaller of the max slot cycle index and 1 as the slot cycle index, otherwise the mobile station uses the slot cycle index not more than the slot cycle index.

Wherein, the mobile station not supporting the minus slot function means the PTT version number is less than 4.

Preferably, if a user instructs the mobile station to modify the slot cycle index, the mobile station executes a parameter change registration.

Preferably, the system identifier and the network identifier are contained in a system parameter message or in an ANSI-41 system parameter message.

Preferably, the mobile station comprises a mobile terminal, a fixed station and a vehicle station.

By the above technology scheme of the present invention, through introducing the minus slot, the mobile station determines the paging slot used according to the minus slot information received so as to solve the problem existed in the related art that it is slow to access for the mobile station being called after starting up, thus the access speed of the mobile station after starting up can be improved, and the paging slot can be determined for the mobile station which does not support minus slot paging.

Other features and advantages of the present invention will be described in the following specification, and partly apparent therefrom, or understood by implementing the present invention. The objects and other advantages of the present invention will be realized and obtained through the structures specially defined in the specification, claims and drawings.

BRIEF DESCRIPTION OF THE DRAWINGS

The drawings provide a further understanding to the present invention, and form a part of the specification. The drawings are used to explain the present invention together with the embodiments of the present invention without unduly limiting the scope of the present invention, wherein.

DETAILED DESCRIPTION OF EMBODIMENTS

Function Overview

Figure 1:
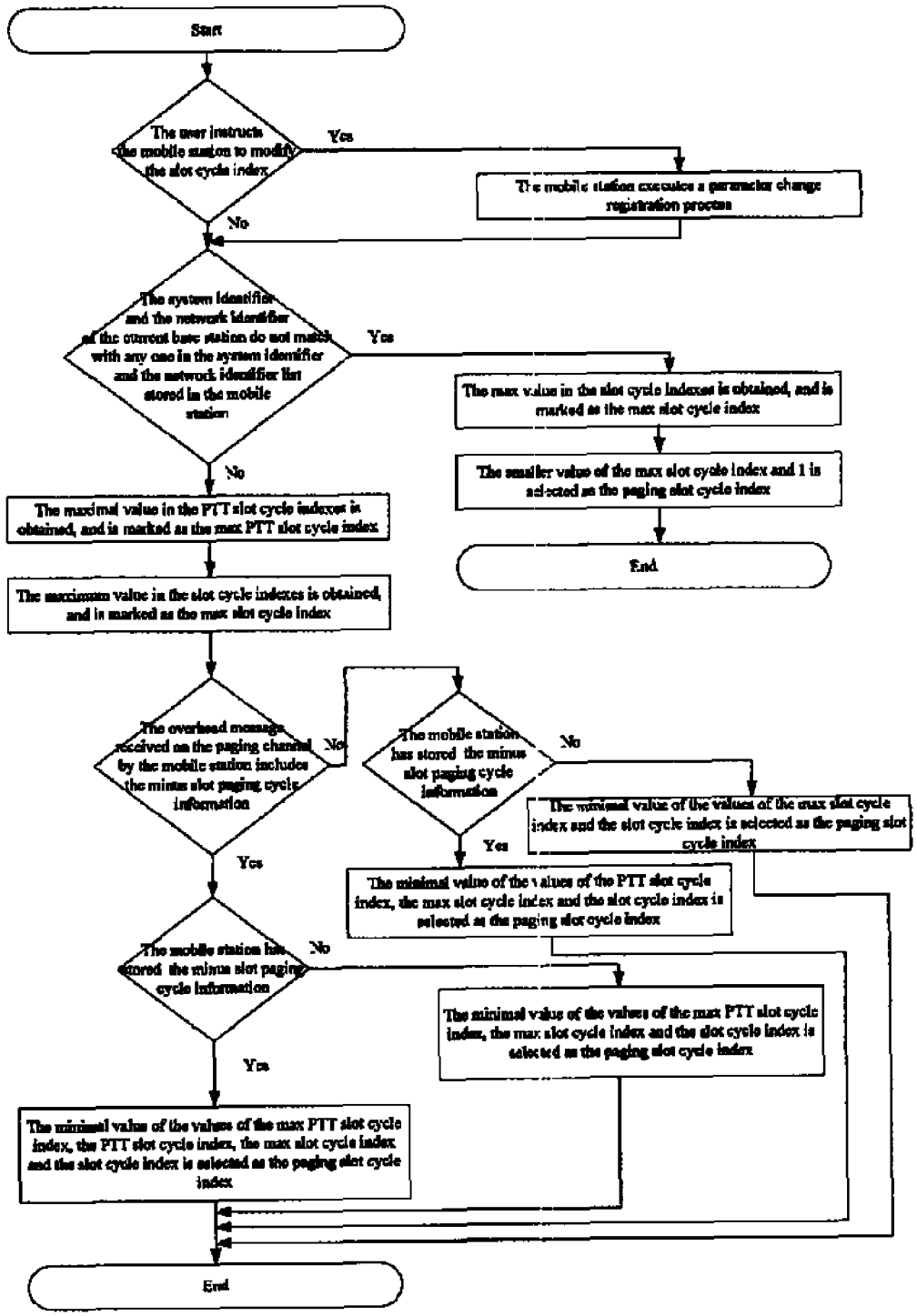
FIG. 1 is a flow chart of a method for determining a paging slot of a CDMA mobile station trunking service according to one embodiment of the present invention.

Considering the problem existed in the related art that it is slow to access for the mobile station being called after starting up, the embodiments of the present invention provide an improved scheme for determining a paging slot of a CDMA mobile station trunking service. In the scheme provided by the embodiments of the present invention, the minus slot of the paging slot is introduced firstly, then the mobile station determines the paging slot used according to the minus slot information received and the PTT version number of the mobile station, so that the access speed of the mobile station after starting up can be improved.

The preferable embodiments of the present invention will be described hereinafter in conjunction with the drawings. What should be understood is that the preferable embodiments described here are only used to illustrate and explain the present invention without unduly limiting the scope of the invention. The embodiments of the present invention and the features of the embodiments can be combined with each other if there is no conflict The embodiments of the present invention provide a method for determining a paging slot of a CDMA mobile station trunking service. The method includes 2 situations: the mobile station supporting the minus slot function, and the mobile station not supporting the minus slot function. The method provided by the embodiment can be executed in a computer system, such as a set of computer executable instructions.

Before performing a detailed explanation to the method provided by the embodiments of the present invention, what needs to be explained is that the mobile station has stored a PTT version number corresponding to the functions of the mobile station. The corresponding relation which is shown in Table 1 indicates whether the mobile station supports the minus slot function.

TABLE 1

| Version number of the mobile station protocol | Function description of the mobile station |
| --- | --- |
| 1 | PTT enhanced group call |
| 2 | Supporting a quick call access of the mobile station |
| 3 | Supporting a big group paging of the mobile station |
| 4 | Reserved |
| 5 | Supporting a mobile station minus slot paging, the first stage of a PTT traditional group call |
| 6 | Supporting a supplementary channel transmitting signaling, the second stage of the PTT traditional group call |

As shown in Table 1, if the PTT version number is larger than or equal to 4, the mobile station supports the minus slot function; and if the PTT version number is smaller than 4, the mobile station does not support the minus slot function Particularly, if the PTT version number of the mobile station is 1, it corresponds to PTT enhanced group call; if the PTT version number of the mobile station is 2, it corresponds to supporting a quick call access of the mobile station; if the PTT version number of the mobile station is 3, it corresponds to supporting a big group paging of the mobile station; if the PTT version number of the mobile station is 5, it corresponds to supporting a minus slot paging and the first stage of a PTT traditional group call of the mobile station; if the PTT version number of the mobile station is 6, it corresponds to supporting a supplementary channel transmitting signaling of the mobile station (i.e., the mobile station supports the supplementary channel transmitting signaling) and the second stage of the PTT traditional group call.

The method for determining the paging slot when the mobile station supports the minus slot function (the first embodiment) and the method for determining the paging slot when the mobile station does not support the minus slot function (the second embodiment) will be described in detail hereinafter.

The First Embodiment

FIG. 1 illustrates the flow of the method for determining a paging slot of a CDMA mobile station trunking service according to one embodiment of the present invention. In this first embodiment, the mobile station supports the minus slot function, and the method for determining a paging slot of a CDMA mobile station trunking service based on it comprises the following processes:

if a user instructs the mobile station to modify the slot cycle index, the mobile station executes the process of the parameter change registration.

If the system identifier (SID) and the network identifier (NID) (the SID and the NID are contained in a system parameter message or in an ANSI-41 system parameter message.) of the base station do not match with any one in an SID and an NID list stored in the mobile station, the mobile station calculates a paging slot according to a slot cycle index which is a value not more than the smaller of a max slot cycle index and 1; otherwise, the slot cycle index will be calculated according to the processing processes of the following four situations:

situation one, if the mobile station receives minus slot paging cycle information on a paging channel overhead message (obtaining a max PTT slot cycle index from the PTT system parameter massage), and the mobile station has stored a piece of minus slot paging cycle information (for example, a PTT slot cycle index), the mobile station calculates the paging slot by obtaining a minimal value from the four parameters of a max PTT slot cycle index, the PTT slot cycle index, the max slot cycle index, and a slot cycle index (i.e., the formula Min (max PTT slot cycle index, PTT slot cycle index, max slot cycle index, slot cycle index) is used to determine the minimal value);

situation two, if the mobile station receives the minus slot paging cycle information on the paging channel overhead message, but the mobile station has not stored a piece of the minus slot paging cycle information, the mobile station calculates the paging slot by obtaining a minimal value from the three parameters of the max PTT slot cycle index, the max slot cycle index, and the slot cycle index;

situation three, if the mobile station does not receive the minus slot paging cycle information on the paging channel overhead message, but the mobile station has stored a piece of the minus slot paging cycle information, the mobile station calculates the paging slot by obtaining a minimal value from the three parameters of the PTT slot cycle index, the max slot cycle index, and the slot cycle index;

situation four, if the mobile station does not receive the minus slot paging cycle information on the paging channel overhead message, and the mobile station has not stored a piece of the minus slot paging cycle information, the mobile station calculates the paging slot by obtaining a minimal value from the two parameter of the max slot cycle index and the slot cycle index.

The Second Embodiment

Figure 2:
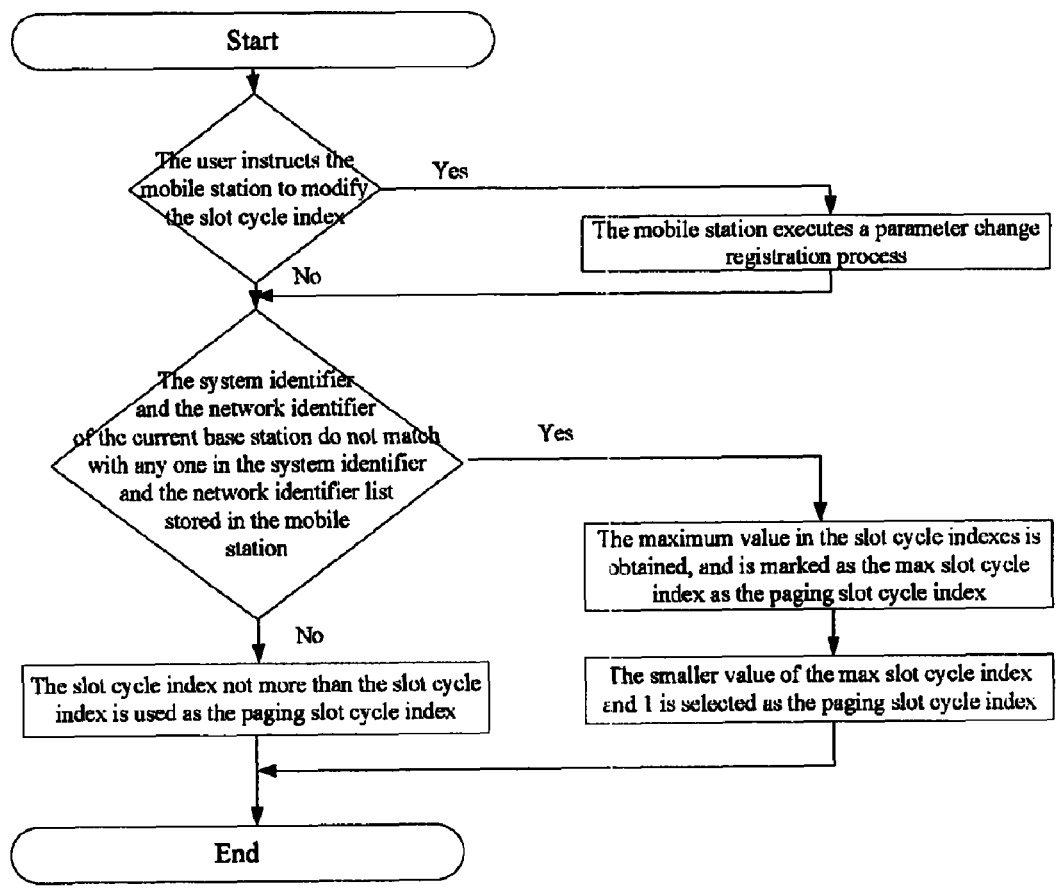
FIG. 2 is a flow chart of a method for determining a paging slot of a CDMA mobile station trunking service according to another embodiment of the present invention.

FIG. 2 illustrates the flow of the method for determining a paging slot of a CDMA mobile station trunking service according to another embodiment of the present invention. In this second embodiment, the mobile station does not support the minus slot function, and the method for determining a paging slot of a CDMA mobile station trunking service based on it comprises the following processes:

Firstly, if a user instructs the mobile station to modify the slot cycle index, the mobile station executes the parameter change registration.

Then, if the system identifier and the network identifier of the base station (the system identifier and the network identifier are contained in a system parameter message or in an ANSI-41 system parameter message of the American National Standards Institute (ANSI)) do not match with any one in the system identifier and the network identifier list stored in the mobile station, the mobile station selects a value not more than the smaller of the max slot cycle index and 1 as the slot cycle index, otherwise the mobile station uses the slot cycle index not more than the slot cycle index.

The paging slot cycle index of the mobile station may be determined through the processing processes of the above two embodiments. Then, the slot cycle length may be determined according to the paging slot cycle index. Table 2 shows the corresponding relation between the paging slot cycle index and the slot cycle length.

TABLE 2

| Slot cycle index | Sign slot cycle Index | Max PTT slot cycle index | Slot cycle length |
| --- | --- | --- | --- |
| −7 | N/A | N/A | Non-slotted |
| −4 | 0 | 100 | 0.08 s (1 slot) |
| −3 | 0 | 011 | 0.16 s (2 slots) |
| −2 | 0 | 010 | 0.32 s (4 slots) |
| −1 | 0 | 001 | 0.64 s (8 slots) |
| 0 | N/A | 000 | 1.28 s (16 slots) |
| 1 | 1 | 001 | 2.56 s (32 slots) |
| 2 | 1 | 010 | 5.12 s (64 slots) |
| 3 | 1 | 011 | 10.24 s (128 slots) |
| 4 | 1 | 100 | 20.48 s (256 slots) |
| 5 | 1 | 101 | 40.96 s (512 slots) |
| 6 | 1 | 110 | 81.92 s (1024 slots) |
| 7 | 1 | 111 | 163.84 s (2048 slots) |

The processing processes for the paging slot of a CDMA mobile station trunking service by using the method provided by the embodiments of the present invention are described hereinbefore. On the other hand, the paging slot of a corresponding base station may be determined according to the method shown in FIG. 3.

Figure 3:
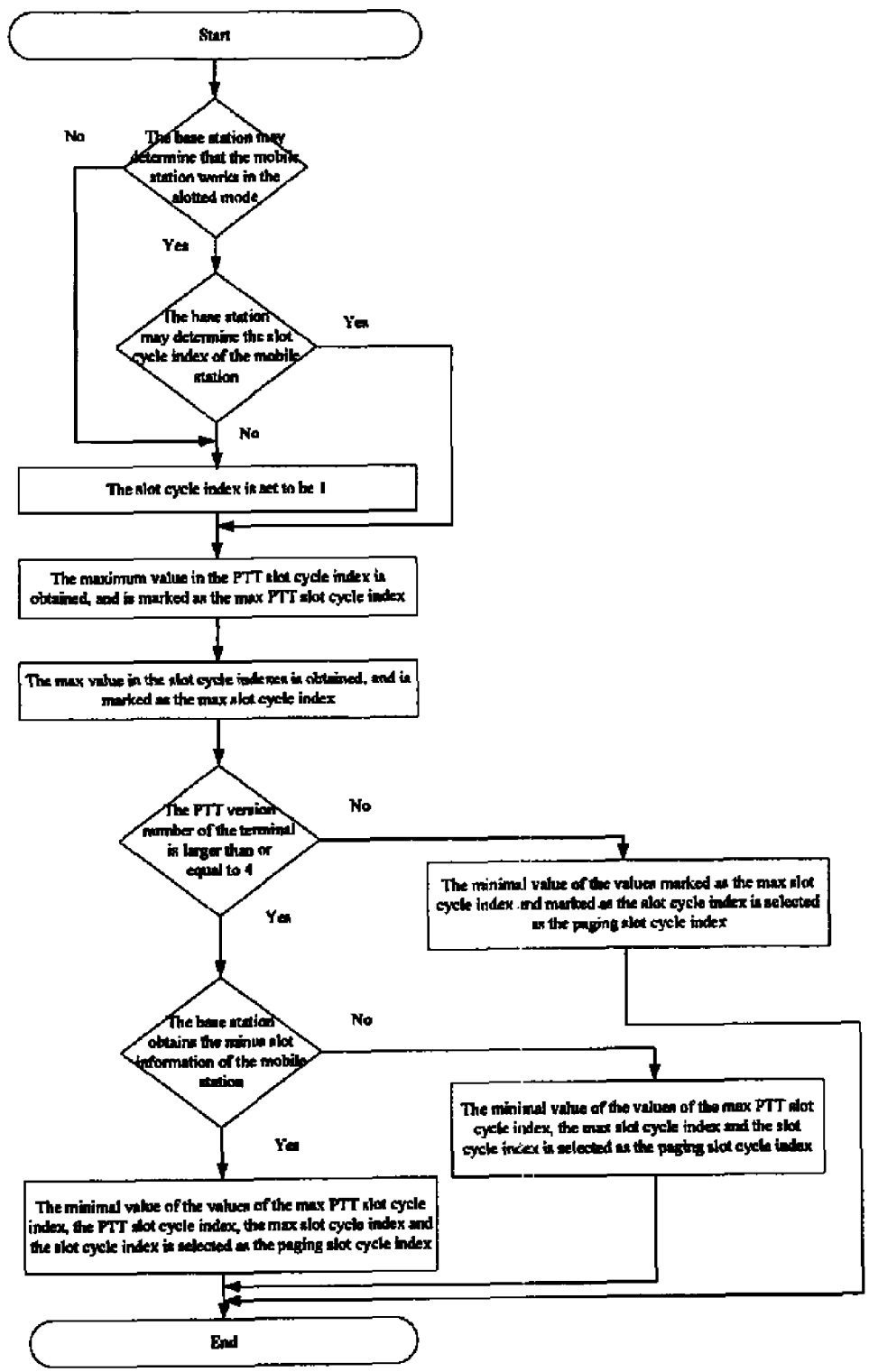
FIG. 3 is a flow chart of a method that a corresponding base station determines paging slot of a trunking service after using the method of the present invention.

FIG. 3 is a flow chart of a method that a corresponding base station determines paging slot of a trunking service after using the method of the present invention. As shown in FIG. 3, the method for determining the paging slot of the base station comprises one of the following:

one, if the PTT version number of the mobile station is larger than or equal to a preset value (an arbitrary value from 1 to 9), and the minus slot information of the mobile station is obtained, the minimal value of the four parameters of the max PTT slot cycle index, the PTT slot cycle index, the max slot cycle index, and the slot cycle index will be chosen as a first slot cycle index, and the base station will perform paging to the mobile station according to the slot cycle determined by the first slot cycle index;

two, if the PTT version number of the mobile station is larger than or equal to the preset value, and if the base station does not obtain the minus slot information of the mobile station, the base station will select the minimal value of the three parameters of the max PTT slot cycle index, the max slot cycle index, and the slot cycle index as an second slot cycle index, and performs paging to the mobile station according to the slot cycle determined by the second slot cycle index;

three, if the PTT version number of the mobile station is smaller than the preset value, the base station will select the minimal value of the max slot cycle index and the slot cycle index as an third slot cycle index, and the base station performs paging to the mobile station according to the slot cycle determined by the third slot cycle index; wherein when the base station can not determine whether the mobile station works in the slotted mode, or can not determine the slot cycle index of the mobile station, the slot cycle index will use the value 1, and then calculation will be performed according to above method.

What needs to be explained is that the mobile station in the present invention may comprise a mobile terminal, a fixed station, and a vehicle station and so on.

Determining the paging slot of the present invention and determining the paging slot of the corresponding base station will be described herein after in conjunction with two specific examples.

The First Example

On the PTT terminal side, the slot cycles of terminal A and base station C are determined under the circumstance that a plurality of terminals such as terminal A and terminal B are in the same group and are subordinate to the base station C. It is assumed that the value of the max PTT slot cycle index at the base station C side is 4, the current value of the PTT slot cycle index is −1, the value of the slot cycle index is 4, and the value of the max slot cycle index is 6.

First, terminal A is started up, performs a starting-up registration, receives the system parameter message, and determines the slot of terminal A according to these parameters after receiving the system parameter message. If terminal A receives minus slot paging cycle information on the paging channel overhead message (the max PTT slot cycle index is obtained from the PTT system parameter message), and terminal A has stored the minus slot paging cycle information (for example, a PTT slot cycle index), terminal A will calculate the paging slot according to the formula Min (max PTT slot cycle index, PTT slot cycle index, max slot cycle index, slot cycle index), i.e., take the minimal value in (4, −1, 6, 4), so as to select −1 as the paging slot cycle of terminal A.

Then, the paging slot of base station C is determined. Assuming that the PTT version number sent to base station C by terminal A is 5, and the value of the slot cycle index of terminal A is −1, the base station C will perform paging to terminal A according to the slot cycle index determined according to the formula Min (max PTT slot cycle index, PTT slot cycle index, max slot cycle index, slot cycle index), i.e., take the minimal value in (4, −1, 6, 4), thus the slot cycle index determine is determined to be −1 to perform paging to terminal A.

The Second Example

On the PTT terminal side, the slot cycles of terminal A and base station C are determined under the circumstance that terminals such as terminal A and terminal B are in the same group and are subordinate to base station C. It is assumed that the value of the max PTT slot cycle index at base station C side is 4, the current value of the PTT slot cycle index is 1, the value of the slot cycle index is 4, and the value of the max slot cycle index is 6.

First, terminal A is started up, performs a starting-up registration, receives the system parameter message, and may determine the slot of the terminal A according to these parameters after receiving this message If terminal A does not receive the minus slot paging cycle information on the paging channel overhead message, but terminal A has stored the minus slot paging cycle information, terminal A will calculate the paging slot according to the formula Min (PTT slot cycle index, max slot cycle index, slot cycle index), i.e., select the minimal value in (1, 6, 4), so as to determine that the current paging slot cycle is 1.

Then, the paging slot is determined at base station C side. It is assumed that the PTT version number sent to base station C by terminal A is 6, and the value of the time cycle index of terminal A is 1, base station C will perform paging to terminal A according to the slot cycle determined by the formula Min (max PTT slot cycle index, PTT slot cycle index, max slot cycle index, slot cycle index), i.e., take the minimal value in (4, 1, 6, 4), and at the end the slot cycle index is determined to be 1 so as to perform paging to terminal A according to this slot cycle index.

In addition, the embodiments can be realized through hardware, software, firmware, middleware, microcode, hardware description language or the combinations thereof. When the embodiments are realized through software, firmware, middleware or microcode, the program codes or code segments used to execute necessary tasks may be stored in the machine readable media such as a storage media. (A plurality of) processors may execute the necessary tasks. The code segments can represent the arbitrary combination of a process, a function, a subprogram, a program, a routine program, a subroutine program, a module, an object, a software package, a class, or an instruction, a data structure, or a program language. A code segment is coupled with another code segment or a hardware circuit by transmitting and/or receiving information, a data, an independent variable, or storage contents. The information, the independent variable, the parameter, the data and so on may be transferred, transported, or transmitted in any appropriate ways such as memorizer share, message transfer, token transfer, network transmission.

To sum up, by the above technology scheme of the present invention, through introducing the minus slot, the mobile station determines the paging slot used according to the minus slot information received, thus the access speed of the mobile station after starting up can be improved, and the paging slot can be determined for the mobile station which does not support minus slot paging.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for determining a paging slot of a CDMA mobile station trunking service, the method comprising:
   when the mobile station supports minus slot function:
   if a system identifier and a network identifier of a base station do not match with any one in a system identifier and a network identifier list stored in the mobile station, the mobile station calculating a paging slot according to a slot cycle index which is a value not more than the smaller of a max slot cycle index and 1; otherwise, if the mobile station receives minus slot paging cycle information on a paging channel overhead message, and the mobile station has stored a piece of minus slot paging cycle information, the mobile station calculating the paging slot by obtaining a minimal value from a max PTT slot cycle index, a PTT slot cycle index, the max slot cycle index, and a slot cycle index;

if the mobile station receives the minus slot paging cycle information on the paging channel overhead message, but the mobile station has not stored a piece of the minus slot paging cycle information, the mobile station calculating the paging slot by obtaining a minimal value from the max PTT slot cycle index, the max slot cycle index, and the slot cycle index;

if the mobile station does not receive the minus slot paging cycle information on the paging channel overhead message, but the mobile station has stored a piece of the minus slot paging cycle information, the mobile station calculating the paging slot by obtaining a minimal value from the PTT slot cycle index, the max slot cycle index, and the slot cycle index; and if the mobile station does not receive the minus slot paging cycle information on the paging channel overhead message, and the mobile station has not stored a piece of the minus slot paging cycle information, the mobile station calculating the paging slot by obtaining a minimal value from the max slot cycle index and the slot cycle index; and when the mobile station does not support the minus slot function:

if the system identifier and the network identifier of the base station do not match with any one in the system identifier and the network identifier list stored in the mobile station, the mobile station selecting a value not more than the smaller of the max slot cycle index and 1 as the slot cycle index, otherwise the mobile station using the slot cycle index not more than the slot cycle index.

2. The method according to claim 1, wherein a PTT version number corresponding to the function of the mobile station is stored in the mobile station.

3. The method according to claim 2, wherein the mobile station supporting the minus slot function means the PTT version number is larger than or equal to 4.

4. The method according to claim 2, wherein if the PTT version number of the mobile station is 1, it corresponds to PTT enhanced group call; if the PTT version number of the mobile station is 2, it corresponds to supporting a quick call access of the mobile station; if the PTT version number of the mobile station is 3, it corresponds to supporting a big group paging of the mobile station; if the PTT version number of the mobile station is 5, it corresponds to supporting a minus slot paging and the first stage of a PTT traditional group call of the mobile station; if the PTT version number of the mobile station is 6, it corresponds to the mobile station supporting a supplementary channel transmitting signaling and the second stage of the PTT traditional group call.

5. The method according to claim 1, wherein a PTT version number corresponding to the function of the mobile station is stored in the mobile station, and when the mobile station does not support the minus slot function, the PTT version number is less than 4.

6. The method according to claim 1, wherein if a user instructs the mobile station to modify the slot cycle index, the mobile station executes a parameter change registration.

7. The method according to claim 1, wherein the system identifier and the network identifier are contained in a system parameter message or in an ANSI-41 system parameter message.

8. The method according to claim 1, wherein the mobile station comprises a mobile terminal, a fixed station and a vehicle station.

* * * * *